4-387
/25/86 03 RE 32,296

United States Patent [19]

Wynalda

[11] E Patent Number: Re. 32,296

[45] Reissued Date of Patent: Nov. 25, 1986

[54] PACKAGING SYSTEM FOR VIDEO CASSETTES

[75] Inventor: Robert M. Wynalda, Rockford, Mich.

[73] Assignee: Wynalda Litho Inc., Rockford, Mich.

[21] Appl. No.: 737,505

[22] Filed: Jun. 26, 1985

Related U.S. Patent Documents

Reissue of:

[64] Patent No.: 4,488,644
Issued: Dec. 18, 1984
Appl. No.: 582,021
Filed: Feb. 21, 1984

[51] Int. Cl.[4] ..... B65D 85/672; B65D 85/00; B65D 5/44; B65D 6/06

[52] U.S. Cl. ..... 206/387; 206/248; 206/527; 206/814; 206/45.14; 229/9; 229/19

[58] Field of Search ..... 206/387, 527, 526, 525, 206/45.14, 814; 229/9, 19

[56] References Cited

U.S. PATENT DOCUMENTS

| | | | |
|---|---|---|---|
| 2,306,613 | 12/1942 | Chesley | 206/248 |
| 3,395,787 | 8/1968 | Plaskan | 206/259 |
| 3,395,849 | 8/1968 | Gillam | 229/19 |
| 3,675,763 | 7/1972 | Sandel | 206/45.14 |
| 3,721,335 | 3/1973 | Grant | 206/256 |
| 3,759,720 | 9/1973 | Young | 99/171 |
| 4,114,044 | 9/1978 | Chiulli | 250/468 |
| 4,134,495 | 1/1979 | Friedman | 206/387 |
| 4,184,594 | 1/1980 | Hehn | 206/387 |
| 4,241,827 | 12/1980 | Focke | 206/248 |
| 4,291,801 | 9/1981 | Basili et al. | 206/387 |
| 4,303,154 | 12/1981 | Hicks | 206/86 |
| 4,303,159 | 12/1981 | Stone et al. | 206/387 |

FOREIGN PATENT DOCUMENTS 2911217 11/1980 Fed. Rep. of Germany .

*Primary Examiner*—Joseph Man-Fu Moy
*Attorney, Agent, or Firm*—Price, Heneveld, Huizenga & Cooper

[57] ABSTRACT

The specification discloses a packaging system enabling both VHS and BETA video cassettes to be packaged in a common printed sleeve. The system includes a printed paperboard sleeve dimensioned to closely receive the larger VHS cassette. The system further includes a one-piece paperboard tray insertable into the sleeve to accommodate the smaller BETA cassette within the sleeve. The tray includes spacer portions between the sleeve and BETA cassette so that the tray and cartridge are closely received within the printed sleeve.

37 Claims, 6 Drawing Figures

PACKAGING SYSTEM FOR VIDEO CASSETTES

Matter enclosed in heavy brackets [ ] appears in the original patent but forms no part of this reissue specification; matter printed in italics indicates the additions made by reissue.

BACKGROUND OF THE INVENTION

The present invention relates to video cassettes and more particularly to a system for packaging video cassettes for retail display and sale.

Video cassette cartridges are manufactured primarily in one of two formats—VHS and BETA. These two types of cassette cartridges have different external dimensions. Specifically, the BETA cartridge is smaller than the VHS cartridge both in length and width.

Packaging such cassettes for retail display and sale requires two different size packages for the two different size cassettes. In one packaging system, two printed sleeves are provided. The first printed sleeve is dimensioned to closely receive a VHS cartridge therein. The second printed sleeve is dimensioned to closely receive the smaller BETA cartridge therein. The two separate sleeves create several problems. First, both types of video cassettes are typically manufactured by a common manufacturer, who must inventory both sizes of sleeves to be able to package both VHS and BETA cassettes. This duplication of inventory requires excessive storage area and creates ordering problems. Occasionally, if inventory is not carefully controlled, the manufacturer will exhaust his supply of one type of sleeve and consequently have only the wrong size sleeve for the cartridges to be packaged. Second, separate cutting dies are required for the two different size sleeves. The printer must also change negatives frequently to print two different sleeves for a plurality of titles.

At least two prior artisans have developed retail packaging systems for accommodating different size cassettes within a standard package. Examples of such packages include U.S. Pat. No. 4,134,495, entitled SINGLE SIZE DISPLAY CARTON FOR PACKAGING EITHER A TAPE CASSETTE OR TAPE CARTRIDGE, issued Jan. 16, 1979, to Friedman; and U.S. Pat. No. 3,675,763, entitled BOX FOR HOLDING TAPE CARTRIDGES, issued July 11, 1972, to Sandel. However, these packages have relatively complicated constructions and accordingly require relatively complicated and/or expensive manufacturing equipment. Further, these boxes are typically wasteful of packaging material because they are relatively large in comparison to the size of the cartridges packaged.

In addition to retail packaging materials, at least one storage box has been developed for different size video cassettes. An example of such a box is provided in U.S. Pat. No. 4,303,159, entitled VIDEO PACKAGE, issued Dec. 1, 1981, to Stone et al. This storage box is plastic and internally dimensioned to receive a VHS cassette therein. An L-shaped insert is provided and snap-fits within the box to accommodate the smaller BETA cassette therein. The Stone package is not readily suited to retail display in view of its relatively expensive manufacture and relatively complicated and bulky construction. Further, the plastic box is not readily printable.

SUMMARY OF THE INVENTION

The aforementioned problems are solved by the present invention in which a packaging system for video cassettes is provided enabling both of the prevalent video cassette sizes to be easily, yet efficiently, packaged in a common printed paperboard sleeve.

The present system comprises two elements. The first element is a printed paperboard sleeve dimensioned to closely receive the larger VHS video cartridge therein. A VHS cartridge to be packaged for retail sale is simply inserted into a printed sleeve bearing the appropriate title.

The second element is a one-piece cardboard tray insert receivable within the printed sleeve to accommodate the smaller format BETA cartridge therein. The tray insert includes a floor extending substantially the full width of the printed sleeve and a pair of sidewalls extending upwardly therefrom. The tray further includes a spacer structure at one end thereof for spacing the BETA format cartridge from one end of the printed sleeve when the tray and BETA cartridge are received therein. A BETA cartridge to be packaged is first positioned in a tray insert and then inserted into the common printed sleeve. The tray sidewalls provide appropriate spacing between the BETA cartridge and the sleeve sides; the tray spacer structure provides appropriate spacing between one end of the sleeve and one end of the BETA cartridge such that the opposite ends of the sleeve and cartridge are generally flush.

The packaging system of the present invention eliminates the duplication of inventory previously required both by the manufacturer and the printer. Specifically, the manufacturer need inventory only one size printed sleeve regardless of whether VHS, BETA, or both types of cartridges are to be manufactured and packaged. The tray inserts are common to all printed sleeves regardless of the titles printed on the various sleeves. The packaging system eliminates the need for duplicate printing negatives and cutting dies. In summary, the present invention results in tremendous savings, both to the cassette packagers and to the printers of the packaging.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 4:
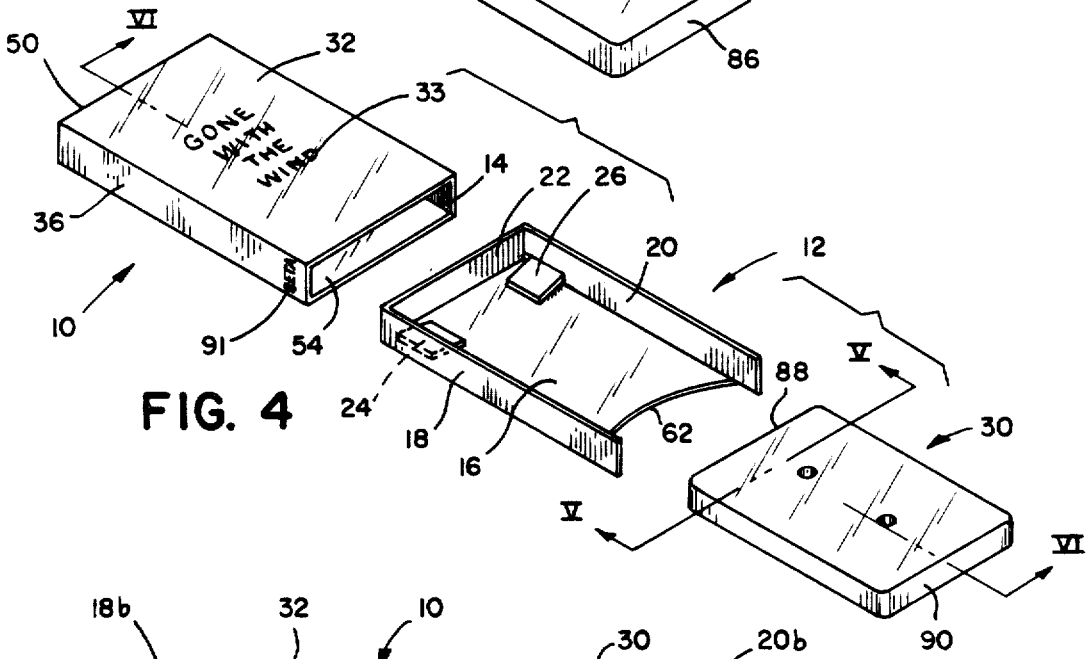
FIG. 4 is a perspective exploded view showing the packaging of a BETA cartridge within the printed sleeve using the tray insert.

The packaging system of the present invention is illustrated in the drawings and generally includes printed cardboard sleeve 10 and tray insert 12 (FIG. 4). Sleeve 10 is generally box-shaped defining open end 14. Tray 12 includes floor 16 and a pair of opposed sidewalls 18 and 20 and end wall 22 extending upwardly therefrom. A pair of spacing tabs 24 and 26 extend inwardly from sidewalls 18 and 20, respectively, proximate end wall 22.

Figure 3:
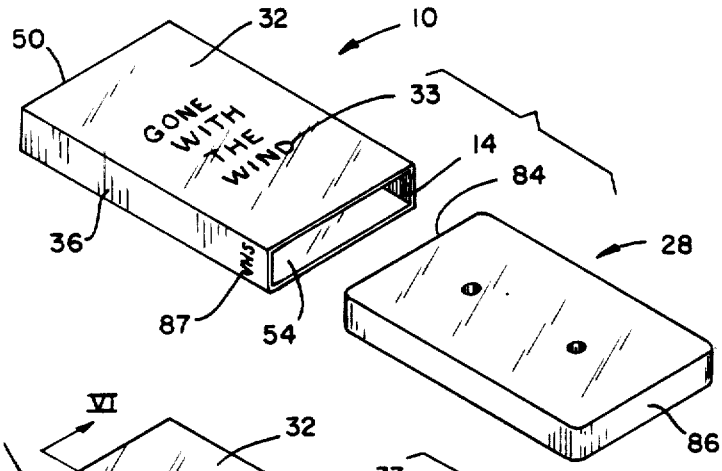
FIG. 3 is a perspective exploded view illustrating the packaging of a VHS cartridge within the printed sleeve.

VHS cartridge 28 (FIG. 3) is packaged by simply sliding the cartridge into the printed sleeve 10 through open end 14. BETA cartridge 30 (FIG. 4) is packaged by first positioning the cartridge within tray 12 on floor 16, between sidewalls 18 and 20, and abutting tabs 24 and 26. The tray and cartridge assembly is then slid into cardboard sleeve 10 through open end 14. Tray insert 12 supports cartridge 30 within the larger printed sleeve 10.

Video cassette cartridges 28 and 30 are generally well-known in the art. Each of the cartridges is generally a rectangular parallelepiped containing a quantity of video tape or other recording medium and suitable for play on a video cassette recorder. Larger cartridge 28 is a VHS format cartridge having dimensions of approximately seven and one-quarter inches by four and one-eighth inches by seven-eighths inch. The smaller cartridge 30 is a BETA format cartridge and has external dimensions of approximately six and one-eighth inches by three and seven-eighths inches by seven-eighths inch. The present invention is adaptable to virtually any cassette cartridges wherein all of the external dimensions of one are equal to or less than the corresponding external dimensions of the other. The VHS and BETA format cartridges are disclosed and described in the present application because these cartridges are the most popular video cartridges currently available.

Figure 1:
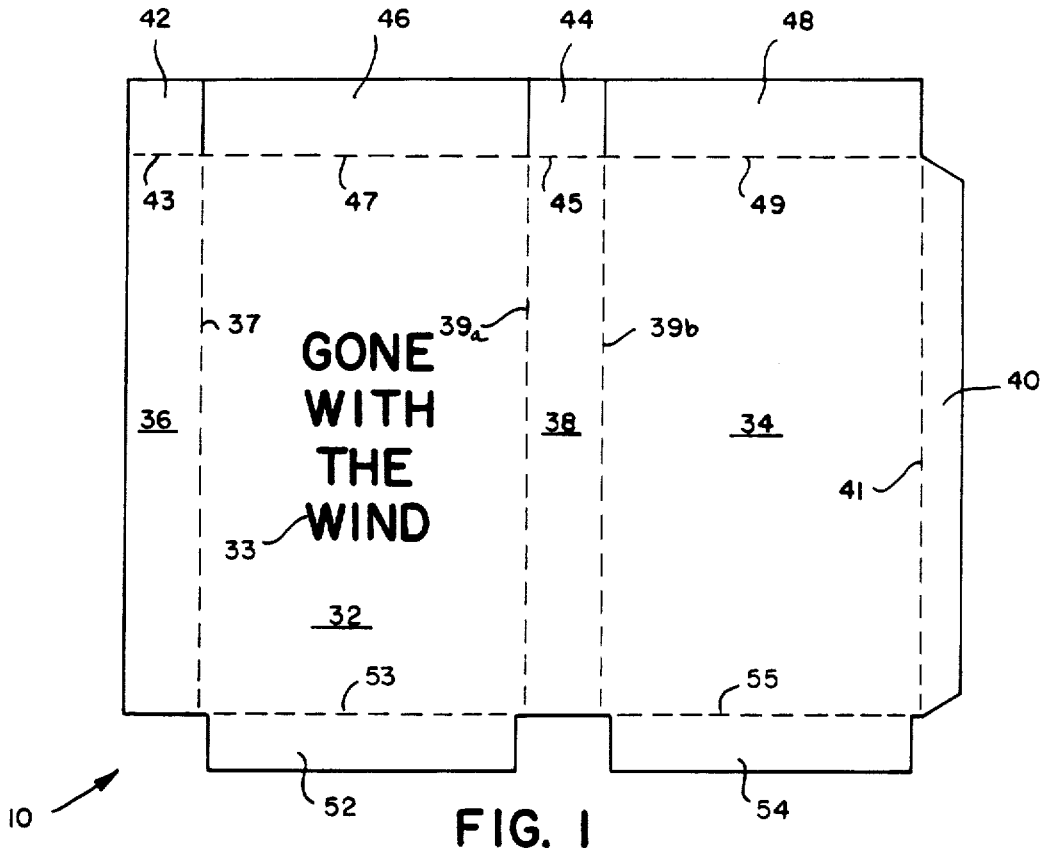
FIG. 1 is a plan view of the printed sleeve of the present invention prior to folding.

The blank or stock of which sleeve 10 is fabricated is a lightweight paperboard and is illustrated in FIG. 1. Fold lines are designated by dashed lines, while cuts are illustrated by solid lines. Sleeve 10 includes rectangular top 32 and rectangular bottom 34 which are generally parallel one another in the assembled article (see FIGS. 5 and 6). A title 33 indicative of the cassette to be packaged therein is printed on top 32. Rectangular sidewalls 36 and 38 extend between top 32 and bottom 34 in the assembled article and are generally parallel one another. Sidewall 36 is joined to top 32 at fold line 37, and sidewall 38 is joined both to top 32 and bottom 34 by fold lines 39a and 39b, respectively. Trapezoidal gluing flap 40 extends from bottom 34 along fold line 41 opposite side 38 to be adhesively secured to side 36 in assembled sleeve 10. End tabs 42 and 44 extend from sidewalls 36 and 38 along fold lines 43 and 45, respectively, and are folded generally perpendicularly thereto in the assembled article. Top end flap 46 and bottom end flap 48 extend from top 32 and bottom 34 along fold lines 47 and 49, respectively, and are folded generally perpendicularly thereto to overlie one another in assembled sleeve 10. Closed end 50 is created in sleeve 10 by the folded and glued flaps 46 and 48 (see FIG. 6). Open end flaps 52 and 54 extend from top 32 and bottom 34 along fold lines 53 and 55, respectively, opposite flaps 46 and 48 and are folded inwardly upon the top and bottom, respectively, and adhesively secured thereto to provide a dressed appearance and increased strength for open end 14. Additionally, bottom flap 54 locks tray 12 within sleeve 10 when the tray is used as will be described (see FIG. 6).

Figure 2:
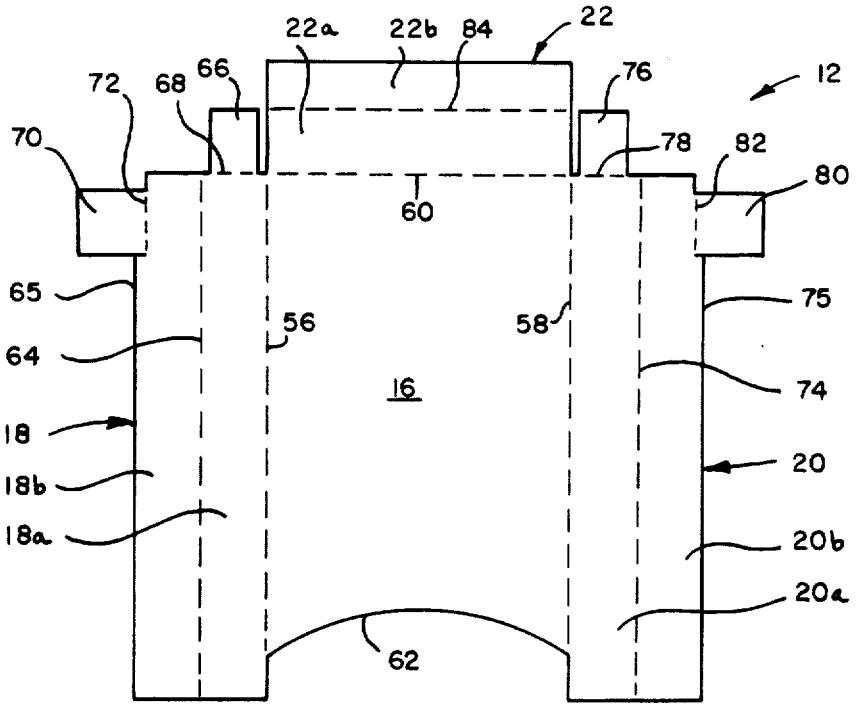
FIG. 2 is a plan view of the tray insert of the present invention prior to folding.

The blank or stock from which tray 12 is fabricated is also a lightweight paperboard and is illustrated in FIG. 2. Tray 12 includes floor or bottom 16 having a pair of opposite parallel side edges 56 and 58 and an end edge 60 extending generally perpendicularly therebetween. Opposite arcuate end edge 62 extends between side edges 56 and 58.

Sidewall 18 (FIG. 2) includes rectangular outer flap 18a and rectangular inner flap 18b separated by fold line 64. Inner flap 18b defines edge 65 generally parallel to both of fold lines 56 and 64. Locking tab 66 is integral with and extends away from outer flap 18a along fold line 68 in a direction generally perpendicular to fold line 64. Spacing means is provided by spacing tab 70 which is connected to inner flap 18b at fold line 72. Tab 70 extends further away from floor 16 than does inner flap 18b in the unfolded blank. Fold line 72 is closer to floor 16 than edge 65 of inner flap 18b.

Sidewall 20 (FIG. 2) includes outer flap 20a and inner flap 20b separated by fold line 74. Inner flap 20b defines edge 75 generally parallel to both of fold lines 58 and 74. Locking tab 76 is integral with and extends from outer flap 20a along fold line 78. Spacer tab 80 is integral with and extends from inner flap 20b along fold line 82. Fold line 82 is closer to floor 16 than edge 75, while tab 80 extends further away from floor 16 than does inner flap 20b in the unfolded stock.

End wall 22 includes outer flap 22a and inner flap 22b separated by fold line 84.

ASSEMBLY AND OPERATION

The stock of which printed sleeve 10 is fabricated is printed, and preferably offset printed, to provide top 32, bottom 34, sides 36 and 38, and end flap 46 with desired printing indicia such as title 33. In addition to the title of the cassette to be packaged within the sleeve, other desired printing may include graphics, plot summary, names of actors and actresses, producer, director, and manufacturer. In the preferred embodiment, the printed stock is coated with a UV clear coating. The printed stock is then die cut to form the blank illustrated in FIG. 1, including the various fold lines and cut lines. Top 32 and bottom 34 are folded generally perpendicularly to side 38 such that the top and bottom are parallel one another. Glue flap 40 and side 36 are folded generally perpendicularly to bottom 34 and top 32, respectively, such that the side overlies the glue flap. Suitable adhesive is applied to the glue flap, and the glue flap and side 36 are secured together. Adhesive is applied to the underside of flaps 52 and 54 and the flaps are folded inwardly into the box interior against top 32 and bottom 34, respectively, to provide a finished and strong edge to open end 14. End tabs 42 and 44 are folded toward one another perpendicular to sides 36 and 38, respectively; and end flaps 48 and 46 are folded generally perpendicular to bottom 34 and top 32, respectively, over the folded end tabs. Suitable adhesive is applied to end flap 48 such that when end flap 46 is folded thereagainst, the two end flaps are adhesively secured together. As thus folded, sleeve 10 appears as illustrated in FIGS. 3-6. Assembled sleeve 10 is dimensioned to closely receive a VHS cassette therein. Specifically, the internal dimensions of the sleeve are seven and one-quarter inches between closed end 50 and open end 14, four and one-eighth inches between sidewalls 36 and 38, and seven-eighths inch between top 32 and bottom 34.

Figure 5:
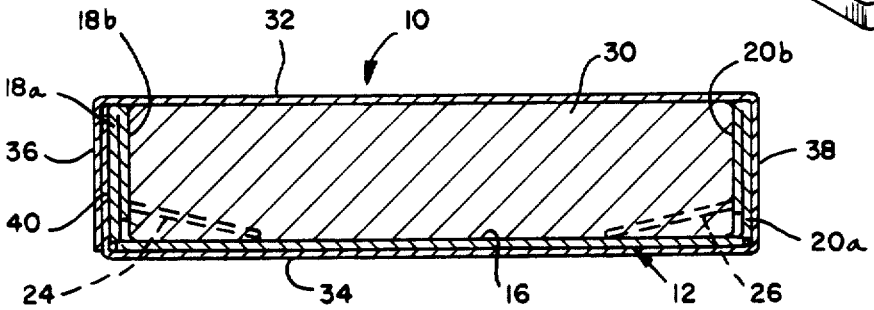
FIG. 5 is a transverse sectional view through the packaged BETA cartridge taken along plate V—V in FIG. 4.
Figure 6:
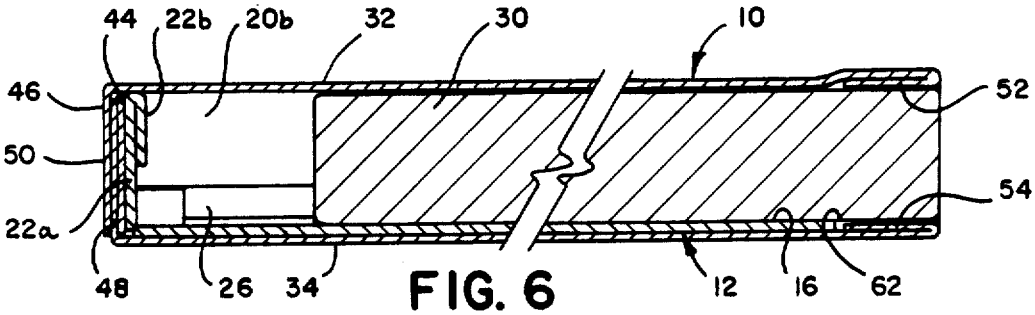
FIG. 6 is a longitudinal sectional view through the packaged BETA cartridge taken along plane VI—VI of FIG. 4.

The blank (FIG. 2) from which tray 12 is folded is also die cut from a sheet of paperboard. Sidewalls 18 and 20 are folded along lines 56 and 58, respectively, to be generally perpendicular to floor 16. Locking tabs 66 and 76 are folded inwardly toward one another until both are generally perpendicular to their respective sidewalls 18 and 20. End wall 22 is folded generally perpendicularly to floor 16 such that outer flap 22a abuts locking tabs 66 and 76. Suitable adhesive is then applied to inner flap 22b which is folded downwardly upon outer flap 22a to be adhesively secured thereto and to secure locking tabs 66 and 76 therebetween. Adhesive is applied to inner flaps 18b and 20b which are folded downwardly against outer flaps 18a and 20a, respectively, to be adhesively secured thereto. Because spacing tabs 70 and 80 extend outwardly beyond edges 65 and 75, respectively, the spacing tabs engage floor 16 as inner walls 18b and 20b are folded into position. Locking tabs 70 and 80 are therefore automatically folded along lines 72 and 82, respectively, to be deployed as illustrated in FIGS. 4–6 as the sidewalls are folded into place. When so folded, tray 12 appears as illustrated in FIGS. 4–6.

Assembled tray 12 is dimensioned to be closely received within sleeve 10. Specifically, the length of sidewalls 18 and 20 is seven and one-quarter inches, the width of floor 16 is four and one-eighth inches, and the height of sidewalls 18 and 20 and end wall 22 is seven-eighths inch. Consequently, when tray 12 is positioned in sleeve 10, floor 16 extends the full width of the sleeve; sidewalls 18 and 20 extends the full length of the sleeve; and sidewalls 18 and 20 and end wall 22 extend the full height of the sleeve.

When the larger VHS cassette 28 is to be packaged for retail sale (FIG. 3), it is simply slid into printed sleeve 10 through open end 14. Because the printed sleeve has substantially the same length as the VHS cassette, end 84 of the cassette will abut closed end 50 of the sleeve and opposite end 86 of the cassette will be generally flush with open end 14 of the sleeve. Designator "VHS" 87 is printed on sidewall 36 to indicate that a VHS format cassette is contained within sleeve 10.

When the smaller BETA cassette 30 is to be packaged (FIG. 4), the cartridge is first positioned within tray 12; and the tray/cartridge subassembly is slid into printed sleeve 10. When the tray and cartridge are fully slid into position within sleeve 10, arcuate edge 62 locks behind flap 54 (see FIG. 6); cartridge end 88 abuts spacing tabs 24 and 26; and opposite end 90 is generally flush with open sleeve end 14. Sidewalls 18 and 20, each of which is approximately one-eighth inch thick, provides spacing between the cartridge and sleeve sidewalls 36 and 38. Cartridge 30 is therefore securely maintained within sleeve 10. Designator "BETA" 91 is printed on sleeve sidewall 36 to indicate that a BETA format cassette is contained within sleeve 10.

As will be readily appreciated, the present invention eliminates the previously required duplication of printing negatives and cutting dies required to provide two separate printing sleeves for the two different size video cassettes. Additionally, the present invention reduces inventory problems of the tape manufacturer, who need inventory only one size printed sleeve for each title manufactured.

The above description is that of a preferred embodiment of the invention. Various changes and alterations can be made without departing from the spirit and broader aspects of the invention as set forth in the claims, which are to be interpreted in accordance with the principles of patent law, including the doctrine of equivalents.

The embodiments of the invention in which an exclusive property or privilege is claimed are defined as follows:

1. A video cartridge packaging system comprising:

a printed sleeve dimensioned to closely receive a first relatively large cassette, said sleeve including a closed end and an open end, whereby the first cartridge is packaged for retail sale simply by sliding the first cartridge into the printed sleeve through the open end; and a tray dimensioned to fit within said sleeve, said tray including a floor and a pair of sidewalls extending upwardly from opposite sides thereof, said tray further including an end abutting the closed sleeve end when the tray is positioned within said sleeve, said tray further including spacer means for spacing an object from said tray end, said tray being dimensioned to receive a second relatively small cartridge between said sidewalls and abutting said spacer means, whereby the second cartridge is packaged for retail sale by positioning the second cartridge on said tray and sliding said tray and cartridge thereon into the printed sleeve through the open end until said tray end abuts said closed sleeve end.

2. A cassette packaging system as defined in claim 1 wherein said tray comprises a single sheet of folded paperboard.

3. A cassette packaging system as defined in claim 2 wherein said sleeve comprises a single sheet of folded paperboard.

4. A cassette packaging system as defined in claim 1 wherein said spacer means comprises at least one tab integral with and extending outwardly over said tray floor from at least one of said tray sidewalls.

5. A cassette packaging system as defined in claim 1 wherein said tray further comprises an end wall extending upwardly from said floor at said tray end, said end wall being secured to both of said sidewalls.

6. A cassette packaging system as defined in claim 5 wherein said abutment means is integral with and extends from at least one of said end wall and said sidewalls.

7. A cassette packaging system as defined in claim 1 wherein said tray floor extends substantially the full width of said sleeve.

8. A cassette packaging system as defined in claim 1 wherein said sidewalls extend substantially the full length of said sleeve between said closed and open ends.

9. A cassette packaging system as defined in claim 1 wherein said sidewalls extend substantially the full height of said tray.

10. A one-piece packaging tray to be used in packaging a BETA format video cassette within a sleeve dimensioned to closely receive a VHS format video cassette, said tray comprising:

a generally planar floor including a pair of parallel sides and an end;

a pair of sidewalls integral with and extending upwardly from said floor sides;

an end wall integral with and extending upwardly from said floor end, said end wall being secured to each of said sidewalls; and spacer means integral with at least one of said floor, sidewalls, or end walls for spacing a BETA cassette a distance from said end wall when the cartridge is positioned on said floor between said sidewalls, said distance being equal to the difference in length between a VHS cassette and a BETA cassette.

11. A packaging tray as defined in claim 10 wherein said spacer means extends from at least one of said sidewalls toward the opposite sidewall.

12. A packaging tray as defined in claim 11 wherein said one sidewall comprises an outer flap folded upwardly from said floor and an inner flap folded inwardly against said outer flap; and wherein said spacer means comprises a tab extending inwardly from said inner flap over said tray floor, whereby said tab is automatically deployed to its operative position as said sidewall is folded.

13. A packaging tray as defined in claim 10 wherein said floor is substantially the same width as a VHS cassette.

14. A packaging tray as defined in claim 13 wherein said sidewalls are substantially the same height as a VHS cassette.

15. A packaging system for two different size cassette cartridges, said system comprising:

a rectangular parallelepiped printed paperboard sleeve including an opposite top and bottom and a pair of opposite sides extending therebetween, said sleeve further including a pair of opposite ends at least one of which is open to permit insertion of objects into said sleeve, said sleeve being dimensioned to closely receive a relatively large cassette cartridge therein; and a paperboard tray insert adapted to receive a relatively small cassette cartridge and dimensioned to fit within said sleeve through said open end, said tray insert including a bottom extending substantially the full width of said sleeve and a pair of opposed sidewalls extending upwardly therefrom, said tray insert further including integral spacer means for spacing the small cartridge from the other of said sleeve ends when said tray insert is positioned within said sleeve, said tray insert being dimensioned such that said tray insert and the small cassette are closely received within said sleeve.

16. A packaging system as defined in claim 15 wherein said spacer means extends from at least one of said sidewalls.

17. A packaging system as defined in claim 16 wherein said spacer means comprises at least one tab integral with and extending inwardly from said one sidewall.

18. A packaging system as defined in claim 15 wherein said sidewalls extend the full height of said sleeve between said sleeve top and said sleeve bottom.

19. A packaging system as defined in claim 18 wherein said tray insert further includes an end wall extending upwardly from said tray bottom proximate said spacer means, said end wall being secured to both of said insert sidewalls to rigidify said tray insert and facilitate positioning cartridges therein.

*20. A cassette packaging system comprising:*

*a printed sleeve dimensioned to closely receive a first relatively large cartridge, said sleeve including a pair of opposite ends and a pair of opposite sides, whereby the first cartridge is packaged for retail sale simply by sliding the first cartridge into said printed sleeve through one of said ends; and*

*a tray dimensioned to fit within said sleeve, said tray including a floor and sidewall means extending upwardly therefrom for spacing a second relatively small cartridge from at least one of said sleeve sides, said tray further including spacer means for spacing the second cartridge from at least one of said sleeve ends, whereby the second cartridge is packaged for retail sale by sliding the second cartridge onto said tray and into said printed sleeve through said one sleeve end with the cartridge abutting said sidewall means and said spacer means.*

*21. A cassette packaging system as defined in claim 20 wherein said tray comprises a single sheet of folded paperboard.*

*22. A cassette packaging system as defined in claim 21 wherein said sleeve comprises a single sheet of folded paperboard.*

*23. A cassette packaging system as defined in claim 20 wherein said spacer means is integral with and extends from said sidewall means.*

*24. A cassette packaging system as defined in claim 20 wherein said tray floor extends substantially the full width of said sleeve.*

*25. A cassette packaging system as defined in claim 24 wherein said floor includes opposite side portions, and further wherein said sidewall means extends upwardly from both said side portions.*

*26. A cassette packaging system as defined in claim 20 wherein said sidewall means extends substantially the full length of said sleeve between said ends.*

*27. A cassette packaging system as defined in claim 20 wherein said sidewall means extends substantially the full height of said sleeve.*

*28. A packaging tray to be used in packaging a relatively small cassette within a sleeve dimensioned to closely receive a relatively large cassette having a greater length and width than the small cassette, said tray comprising:*

*a generally planar floor including a side edge and an end edge;*

*sidewall means extending upwardly from said floor for spacing the small cassette a first distance from said floor side edge when the small cassette is positioned on said floor abutting said sidewall means, said first distance being equal to the difference in width between the larger cassette and the smaller cassette; and*

*spacer means extending from at least one of said floor and said sidewall means for spacing the smaller cassette a second distance from said end edge when the cartridge is positioned on said floor abutting said spacer means, said second distance being equal to the difference in length between the larger cassette and the smaller cassette.*

*29. A packaging tray as defined in claim 28 wherein said spacer means extends over said floor from said sidewall means.*

*30. A packaging tray as defined in claim 28 wherein said tray is substantially the same width as the larger cassette.*

*31. A packaging tray as defined in claim 30 wherein at least one of said sidewall means and said spacer means is substantially the same height as the larger cassette.*

*32. A packaging tray as defined in claim 28 wherein said floor includes a pair of said side edges and further wherein said sidewall means includes a sidewall proximate each of said floor side edges.*

*33. A packaging system for two different size cassette cartridges, said system comprising:*

*a rectangular parallelopiped printed paperboard sleeve including an opposite top and bottom and a pair of opposite sides extending therebetween, said sleeve further including a pair of opposite ends at least one of which is open to permit insertion of objects into said sleeve, said sleeve being dimensioned to closely receive a relatively large cassette cartridge therein; and*

*a tray insert adapted to receive a relatively small cassette cartridge and dimensioned to fit within said sleeve through said open end, said tray insert including a bottom, at least one sidewall extending upwardly therefrom to space the small cartridge from at least one of said sleeve sides when said tray insert is positioned within said sleeve, and spacer means for spacing the small cartridge from the other of said sleeve ends when said tray insert is positioned within said sleeve, said tray insert being dimensioned such that said tray insert and the small cassette are closely received within said sleeve.*

*34. A packaging system as defined in claim 33 wherein said spacer means extends from said sidewall.*

*35. A packaging system as defined in claim 33 wherein said sidewall extends the full height of said sleeve between said sleeve top and said sleeve bottom.*

*36. A packaging system as defined in claim 33 further comprising an opposed pair of said sidewalls.*

*37. A packaging system as defined in claim 33 wherein said tray is fabricated of paperboard.*

* * * * *